US011599081B2

(12) United States Patent
Johnston et al.

(10) Patent No.: US 11,599,081 B2
(45) Date of Patent: Mar. 7, 2023

(54) METHOD AND APPARATUS FOR PROXY EXECUTION AND COMPUTATION WITH AN INDUSTRIAL CONTROLLER

(71) Applicant: Rockwell Automation Technologies, Inc., Mayfield Heights, OH (US)

(72) Inventors: David A. Johnston, Painesville, OH (US); Michael J. Viste, Milwaukee, WI (US); Ryan L. Schnell, Aurora, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 363 days.

(21) Appl. No.: 16/575,606

(22) Filed: Sep. 19, 2019

(65) Prior Publication Data
US 2020/0150614 A1    May 14, 2020

Related U.S. Application Data

(60) Provisional application No. 62/760,568, filed on Nov. 13, 2018.

(51) Int. Cl.
*G05B 19/05* (2006.01)
*G05B 19/045* (2006.01)
*G06F 1/03* (2006.01)

(52) U.S. Cl.
CPC ......... *G05B 19/052* (2013.01); *G05B 19/045* (2013.01); *G05B 19/054* (2013.01);
(Continued)

(58) Field of Classification Search
CPC .. G05B 19/052; G05B 19/045; G05B 19/054; G05B 19/058; G05B 2219/13009;
(Continued)

(56) References Cited

U.S. PATENT DOCUMENTS 5,845,149 A * 12/1998 Husted ................ G06F 12/0661
710/63
2006/0282550 A1* 12/2006 Fujimoto ......... G06K 19/07732
710/5
(Continued)

FOREIGN PATENT DOCUMENTS

EP        0473 086 A1    3/1992
EP        2511 780 A2   10/2012
JP        2002268712 A   9/2002

OTHER PUBLICATIONS

Rockwell Automation; "Rockwell SoftLogix 5800 System User Manual Chapters 6 and 7"; Rockwell Automation Publication 1789-UM002K-EN-P—Jan. 2015; pp. 105-147—(43) pages.
(Continued)

*Primary Examiner* — Michael D Masinick
*Assistant Examiner* — Christopher W Carter
(74) *Attorney, Agent, or Firm* — Boyle Fredrickson, SC

(57) ABSTRACT

An industrial controller that integrates execution of a control program on the industrial controller with execution of additional functions on an external processing device is disclosed. Integrating the external processing device provides an improved system for third party development of control functions which may be unique to specific applications. The system manages communication between the industrial controller and the external processing device, manages access to data stored in the industrial controller, and makes the details of the integration transparent to the programmer.

18 Claims, 4 Drawing Sheets

(52) U.S. Cl.
CPC ............ *G05B 19/058* (2013.01); *G06F 1/03* (2013.01); *G05B 2219/1204* (2013.01); *G05B 2219/13009* (2013.01); *G05B 2219/13058* (2013.01); *G05B 2219/13164* (2013.01)

(58) Field of Classification Search
CPC  G05B 2219/13058; G05B 2219/13164; G06F 1/03
See application file for complete search history.

(56) References Cited

U.S. PATENT DOCUMENTS

| | | | | |
|---|---|---|---|---|
| 2010/0057826 A1* | 3/2010 | Chow | ................... | G06Q 10/06 |
| | | | | 709/201 |
| 2014/0280528 A1* | 9/2014 | Brandes | ............... | G05B 19/056 |
| | | | | 709/204 |
| 2016/0274552 A1* | 9/2016 | Strohmenger | ......... | G06Q 10/06 |
| 2016/0335065 A1* | 11/2016 | Omori | ...................... | G06F 8/61 |

OTHER PUBLICATIONS

Extended European Search Report dated Apr. 23, 2020; Application No. 19208521.5—(11) pages.
European Examination Communication pursuant to Article 94(3) EPC dated Dec. 13, 2021; Application No. 19208521.5—(6) pages.

\* cited by examiner

METHOD AND APPARATUS FOR PROXY EXECUTION AND COMPUTATION WITH AN INDUSTRIAL CONTROLLER

CROSS-REFERENCE TO RELATED APPLICATIONS

This application claims priority to U.S. Provisional Application Ser. No. 62/760,568, filed Nov. 13, 2018, the entire contents of which is incorporated herein by reference.

BACKGROUND INFORMATION

The subject matter disclosed herein relates to integrating external processing resources into industrial control systems and in particular to a method and system of managing shared resources between internal and external processing routines.

Industrial controllers are specialized computer systems used for the control of industrial processes or machinery, for example, in a factory environment. Generally, an industrial controller executes a stored control program that reads inputs from a variety of sensors associated with the controlled process or machine and, sensing the conditions of the process or machine and based on those inputs and a stored control program, calculates a set of outputs used to control actuators controlling the process or machine. Special control languages, such as "relay ladder logic" are normally used to facilitate programming of the device. Under the direction of the stored program, a processor of the industrial controller periodically examines the state of input devices and updates the state of output devices. In order to ensure predictable control of a machine or process, the control program must be highly reliable and deterministic, that is, executing at well-defined time periods.

Industrial controllers differ from conventional computers in a number of ways. Physically, they are constructed to be substantially more robust against shock and damage and to better resist external contaminants and extreme environmental conditions than conventional computers. The processors and operating systems are optimized for real-time control and are programmed with languages designed to permit rapid development of control programs tailored to a constantly varying set of machine control or process control applications.

Industrial controllers are customizable according to an application's requirements. Commonly, an industrial controller includes a chassis with a number of slots into which modules may be inserted. The modules provide varying functions and/or connections for the industrial controller including, for example, network communications, analog or digital inputs and outputs, counter modules, and the like. The modules receive input signals from sensors, contacts, switches, and other devices on a controlled machine or process and pass the input signals to a processor module. The processor module executes a control program where it receives the input signals and sets output signals on other modules to control actuators, valves, solenoids, and the like on the controlled machine or process responsive to the received inputs. A programmer generates the control program to achieve desired operation of the controlled machine or process.

In certain applications, the programming requirements may exceed the computational abilities of the processor module, and it is necessary to provide an external computational device. In other applications, the programming requirements may fall within the computational abilities of the processor module, but other computational devices may be present in the control system that are better suited than the processor module to execute a portion of the control program. In either application, one or more external computational devices may be used to perform a desired computation and provide a result of the computation to the industrial controller. Using an external computation device, however, is not without certain drawbacks. The industrial controller and the external computational device each execute asynchronously from each other based on their own internal clock. The external computational device requires information, such as internal status flags, the state of certain inputs or outputs, and the like and may share certain tags to which both the industrial controller and the external computational device have access. Data written to or read from the shared tags must be managed such that one controller does not unintentionally overwrite data from the other controller.

Thus, it would be desirable to provide an improved system for managing execution of a control program on multiple processing devices.

It would also be desirable to integrally manage execution of the portions of the control program on each of the processing devices where details of the execution of the portions of the control program on each of the processing devices is transparent to the programmer.

BRIEF DESCRIPTION

The subject matter disclosed herein describes an improved system for managing execution of a control program on multiple processing devices. A control program is stored in memory and executable on a first processor in an industrial controller. The control program includes control instructions executed solely on the first processor and proxy instructions configured to launch execution of a function on an external processing device. It is contemplated that the external processing device may be a computing unit that is physically separate from the industrial controller or, optionally, the external processing unit may be a dedicated module inserted within a chassis of the industrial controller. According to still another embodiment, the external processing unit may be a dedicated function executing in the same processor but on a separate thread or core in parallel to the control program.

An inter-processor interface is configured to manage execution of the portions of the control program executing on each of the processing devices such that details of the execution of the portions of the control program on each of the processing devices is transparent to the programmer. The inter-processor interface establishes a communication connection between the processor and the external processing device. Details of the connection may be stored, for example, in a table defining external processing devices connected to the industrial controller. The table may include metadata defining, for example, a protocol for communication, a port assignment, addresses, and the like. The inter-processor interface may also transmit data from data tables in memory of the industrial controller to the external processing devices for use during execution of the proxy instruction. The inter-processor interface is further configured to manage status bits of the proxy instruction, as required, and to receive data back from the external processing device and to update data in the data tables as required. It is further contemplated that, if required, the inter-processor interface may manage access to the data from other control instructions in the control program during execution of the proxy instruction. Thus, execution of the proxy instruction is integrated with execution of other control instructions in the control program and details of the execution are transparent to a programmer. Rather, the programmer simply identifies a function, data required for the function, and an external processing device on which the function is intended to execute.

According to one embodiment of the invention, an industrial controller configured to coordinate execution of an external processing device with the industrial controller is disclosed The industrial controller includes a memory device, a processor, and an inter-processor interface. The memory device is operative to store a control program and at least one data structure, and the processor is operative to execute the control program. The control program includes at least one proxy instruction to be executed on an external processing device. The inter-processor interface is operative to integrate execution of the at least one proxy instruction on the external processing device with execution of the control program on the processor. The at least one proxy instruction defines data from the at least one data structure required for execution of the corresponding proxy instruction. The inter-processor interface reads the data from the at least one data structure and transmits the data to the external processing device. The inter-processor interface receives a response from the external processing device indicating a status of processing the at least one proxy instruction.

According to another embodiment of the invention, a method of coordinating execution of an external processing device with an industrial controller is disclosed. Multiple control instructions are executed on a processor of an industrial controller, where the control instructions access data from at least one data structure stored in memory of the industrial controller. At least one proxy instruction is executed on the processor of the industrial controller, and the at least one proxy instruction defines at least one function to be executed on an external processing device. The at least one proxy instruction defines shared data from the at least one data structure, and the shared data is accessed by at least one of the control instructions and is required for execution of the at least one proxy instruction. The shared data is read with an inter-processor interface executing on the industrial controller and transmitted to the external processing device with the inter-processor interface. A response from the external processing device, indicating a status of executing the at least one function defined by the at least one proxy instruction, is received at the inter-processor interface.

According to still another embodiment of the invention, a processor module for an industrial controller configured to coordinate execution of an external processing device with the industrial controller is disclosed. The processor module includes a memory and a processor. The memory is operative to store a control program and at least one data structure, and the processor is operative to execute the control program. The control program includes a plurality of control instructions and at least one proxy instruction, where the at least one proxy instruction defines data from the at least one data structure required for execution of the corresponding proxy instruction and the at least one proxy instruction defines at least one function to be executed on an external processing device. The processor is further operative to read the data from the at least one data structure, transmit the data to the external processing device, and receive a response from the external processing device indicating a status of processing the at least one proxy instruction.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
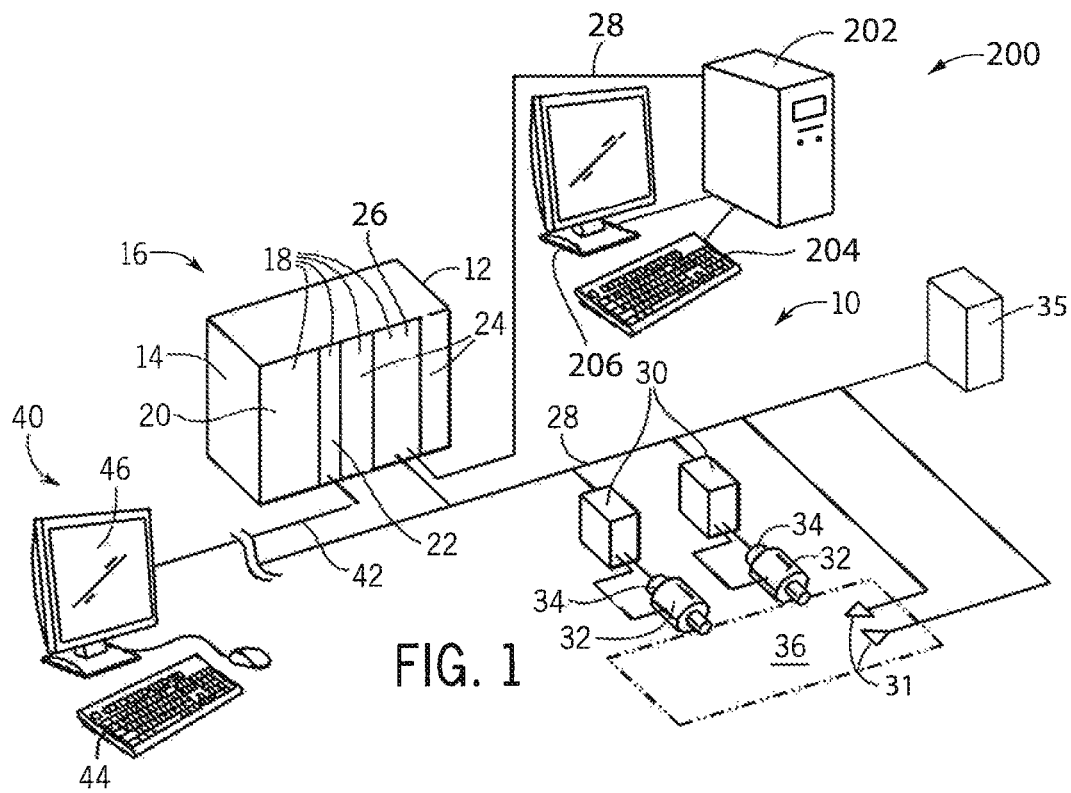
FIG. 1 is a simplified perspective view of an exemplary industrial control system having an industrial controller communicating with multiple external processing devices over a communication network.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

Turning initially to FIG. 1, an industrial control system 10 may include an industrial controller 12 providing generally a chassis 14 having a bus 16, such as a backplane, providing intercommunication between multiple modules 18 installed in the chassis 14. The modules may include, for example, a power supply module 20, a processor module 22, one or more I/O modules 24, and a network module 26. The network module 26, or the processor module 22, may communicate on an industrial control network 28 of a type providing connected messaging with assurances of message completion time, low latency, and lost message detection, for example, ControlNet or EtherNet/IP.

The industrial control network 28 may join the industrial controller 12 to remote I/O modules (not shown), one or more remote motor drives 30, or additional industrial processing devices 35. Each motor drive 30 may communicate with corresponding electric motors 32 and position sensors 34 to provide for controlled motion of the electric motors 32 and thereby to control a portion of the associated industrial machine or process 36. Each motion for the controlled machine or process 36 is also referred to herein as an axis of motion. For example, a machine that moves in three directions (e.g., up/down, forward/reverse, and left/right) has three axes. The axes are often referred to in the coordinate system in which the machine or process 36 is controlled. Therefore, for a machine or process controlled in the Cartesian Coordinate System, the axes may be referred to as an "X" axis, a "Y" axis, and a "Z" axis. Auxiliary axes may also exist for devices such as tool changers, pallet changers, spindles, and the like that interact with the primary axes. Further, each axis may be driven by a single motor 32 or multiple motors operating in tandem. Each motor 32 is typically controlled by a single motor drive 30. However, it is contemplated that a single motor drive 30 may control multiple motors 32 or a single motor 32 be powered by multiple power sections. Each industrial processing device 35 may be a dedicated processor configured to control a particular segment of the controlled process, such as a safety controller monitoring a safety gate, safety mat, light curtain, or the like and being operational to remove power to a portion of the associated machine or process when the safety device indicates the presence of an operator in a restricted area. The network 28 may also join with other devices 31 on the controlled machine or process 36 such as sensors, switches, transducers, and the like that generate inputs for the industrial controller 12 corresponding to a present state of the controlled machine or process or actuators, controlled valves, status indicators, and the like that are controlled by outputs from the industrial controller 12 to achieve desired operation of the controlled machine or process.

A configuration computer 40 may communicate with the processor module 22 and/or the motor drives 30 over the industrial control network 28 or via a dedicated communication channel 42, for example, connecting with the processor module 22. The configuration computer 40 may be a standard desktop or laptop computer and include a keyboard 44, display screen 46, and the like to permit the entry and display of data and the operation of a configuration program by a human operator as will be described below. Optionally, the configuration computer 40 may be an industrial computer with the display 46, user interface, and processing portion integrated into a single housing and configured, for example, to be mounted in a control cabinet.

An external processing device 200 is illustrated in communication with the industrial controller 12 via the network module 26 over the industrial control network 28. The external processing device 200 may also communicate with the processor module 22 over the industrial control network 28 or with either module via a dedicated communication channel. The external processing device 200 may be a generalized computing platform such as a standard desktop computer, a laptop computer, an industrial computer, or the like and include a processing unit 202, a user interface 204, such as a keyboard, a mouse, a touchpad, a touchscreen, or the like, and a display screen 206 to permit the entry and display of data and the operation of the external processing device 200 by a human operator as will be described below.

According to another embodiment of the invention, the external processing device 200 may be implemented as a program, such as a dynamic linked library linked to the control program 54 executing in the processor module 22. The dynamic linked library is stored in the memory 50 of the processor module 22 and executed by the processor 48 when called by the control program 54. According to still another embodiment of the invention, a dedicated module 18 may be provided which is inserted in one of the slots of the industrial controller 12. The dedicated module 18 includes memory in which the external processing routines are stored and a processor to execute the external processing routines. The dedicated module 18 is configured to communicate via the backplane 16 with the processor module 22.

Figure 2:
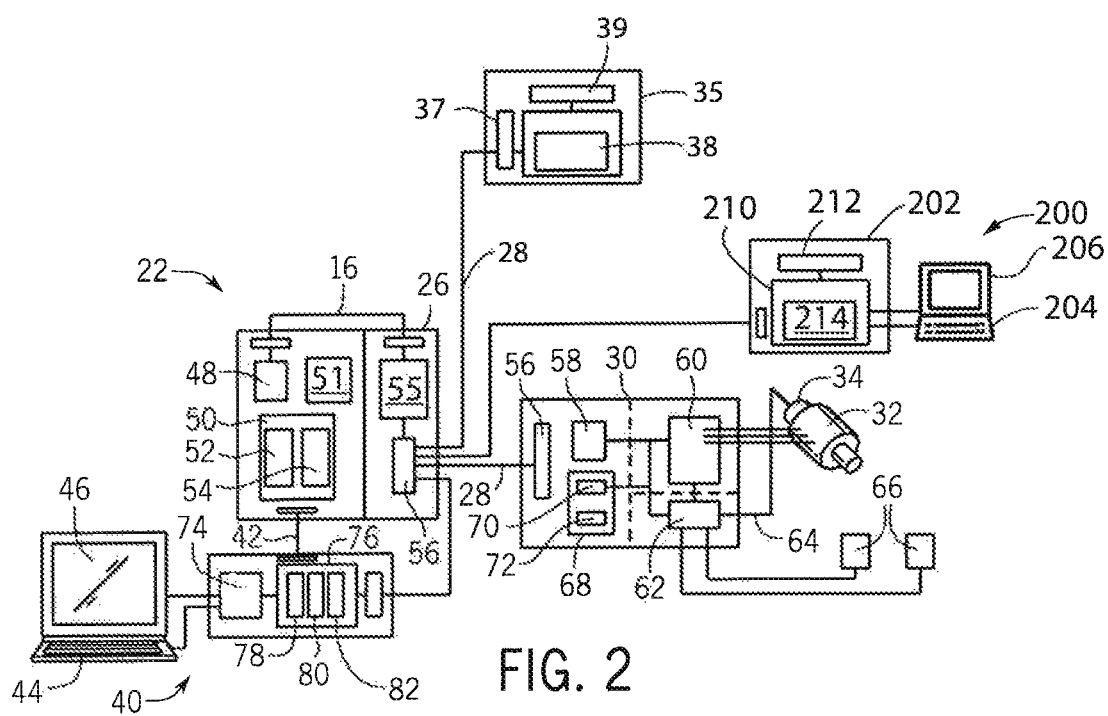
FIG. 2 is a block diagram of the components of the industrial control system of FIG. 1 showing multiple interacting processors of various components executing stored programs in a distributed fashion.

Referring now to FIG. 2, the processor module 22 includes a processor 48 communicating with a stored memory 50 to execute an operating system program 52 generally controlling the operation of the processor module 22, and a control program 54, the latter describing a desired control of the industrial machinery or processes 36 and typically unique to a given application of the industrial control system 10. The memory 50 may also include data tables (see, for example, hardware tables 88, connection tables 90, tag associations 92, and I/O tables 94 in FIG. 3) as used by the control program 54 and as will be described below.

The processor module 22 also includes an inter-processor interface 51 used to integrate communication between the industrial controller 12 and external compute devices such as the external processing device 200 or additional industrial processing devices 35. Although illustrated as a separate module, the inter-processor interface 51 may be a dedicated control circuit, may be integrated as a series of instructions stored within the memory 50 and executed by the processor 48 of the processor module 22, or a combination thereof. The inter-processor interface 51 is in communication with the memory 50 and processor 48 to identify proxy execution instructions 87 which must be performed by one of the external compute devices 200 and to receive return data from the corresponding external compute device, which must be integrated with the data tables of the industrial controller 12 (see FIG. 3). Operation of the inter-processor interface 51 will be discussed in more detail below.

The processor module 22 may communicate over the backplane or an inter-processor communications bus 16 with the network module 26, the latter including operating circuitry 55 (for example being a processor and a stored program and/or dedicated circuitry such as a field programmable gate array). The operating circuitry 55 may communicate with network interface circuitry 56, the latter providing for execution of low-level electrical protocols on the industrial control network 28.

Similar network interface circuitry 56 may be provided in the motor drives 30 to communicate with an internal motor control processor 58 that may, for example, execute a servo controller or frequency control algorithm. The internal processor 58 may also communicate with a switching circuit 60 and an I/O circuit 62. This switching circuit 60 may provide for pulse width control or similar outputs to provide electrical power to drive coils of the motor 32, according to methods well known in the art. The switching circuit 60 generally includes a motor control function determining control parameters for the motor and solid-state devices and drivers that synthesize a voltage, for example one or multiple AC voltage waveforms, that is connected to the motor windings providing power to the motor that controls motor position, torque, speed or the like. The I/O circuits 62 receive feedback signals 64 from sensors 34 on the motors 32 (for example from encoders or the like) and may also receive other inputs, for example, from other machine-based sensors 66, for example, providing registration sensors, limit switches, optical interrupters or the like. The processor 58 may further communicate with a memory 68 holding firmware such as an operating system program 70 or downloaded program elements 72 of control program 54.

As noted above, the configuration computer 40 may be a standard desktop computer having a processor 74 communicating with a memory 76, the latter holding an operating system program 78 as well as various data structures and programs 80, including programs 82 used to configure the industrial control system 10. The computer 40 may also provide for interface circuits communicating between the processor 74, for example, and the industrial network 28 or a separate communication channel 42 to the processor module 22, as well as with the screen 46 and keyboard 44 according to methods well known in the art.

The external processing device 200 may be a standard desktop computer having a processor 210 communicating with a memory 212, the latter holding an operating system program as well as various data structures and programs 214 for execution on the processor, including programs used to generate data used by the controlled machine or process 36. The external processing device 200 may also provide for interface circuits communicating between the processor 210, for example, and the industrial network 28 or a separate communication channel to the processor module 22, as well as with the display screen 206 and keyboard 204 according to methods well known in the art.

Each additional industrial processing device 35 includes a communication interface 37 connecting the device via the industrial network 28 to the industrial controller 12. Each additional industrial processing device 35 also includes a processor 38 communicating with a memory 39, the latter holding various data structures and programs for execution on the processor 38, including programs receiving data from or generating data used by the controlled machine or process 36. The industrial processing device 35 may also provide for interface circuits communicating with a display screen or user interface according to methods well known in the art.

Figure 3:
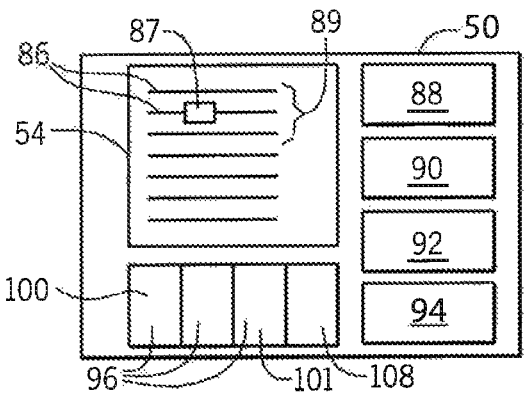
FIG. 3 is a block diagram representation of a control program and data structures used by the industrial controller of FIG. 1.

Referring now to FIG. 3, the memory 50 of the processor module 22 may include data structures 88, 90, 92, 94 and programs, including a copy of the control program 54 to execute on the processor module 22. The data structures may include a hardware table 88 describing capabilities of the various components of the industrial control system 10, for example, including the capabilities of each motor drive 30, the I/O modules 24, and the processor module 22.

The data structures may also include a connection list 90 describing connections between the devices (including, for example, each motor drive 30, the controller modules 18, and I/O devices 31) of the industrial control system 10 according to the conventions of connected messaging. Generally each connection represents a pre-allocated portion of the industrial control network 28. These connections are normally based on data entered by the user indicating the originator and target for each connection. The connection list 90 may also describe a desired bandwidth of the connection, for example, defining an update rate of data transmitted over the connection.

The data structures may further include an association list 92 associating input and output tags in the control program 54 (representing variables used in the control program 54 as reflected by data received from sensors and outputs to actuators and motors) to particular hardware elements as assigned by the user. Tags may similarly be defined to identify particular instructions, such as a proxy execution instruction 87, and/or status bits associated with the instruction. Thus, for example, the tags associated with sensors 66 (shown in FIG. 2) may be further associated to a motor drive 30 physically connected to the sensor 66.

The data structures may also include various, functions, tasks or services 96 used to execute the instructions of the control program 54. These functions tasks or services 96 are normally stored in firmware in the processor module 22 and include functions 101 implementing instructions 86 of the control program 54 as well as services called by those functions. For example, a motion planner 100 may be one of the invoked functions 101. The motion planner 100, when called by the functions 101, generates a motion profile of a time series of motion data (e.g. positions, velocities, or the like). Other functions, tasks, or services 96 include a communication service 108 handling communication between the controller and the various devices. These functions, tasks, or services 96 are normally part of the native environment of the processor module 22 although they may be updated periodically outside of the normal process of developing control programs.

According to one aspect of the invention, the data structures include the metadata defining an external computing device. For convenience, the application will discuss the external processing device 200 as a particular external computing device. It is understood, however, that this embodiment is not intended to be limiting. Rather, the external computing device may be an additional industrial processing device 35, a motor drive 30, or other processing device connected to the industrial network 28. Further, it is contemplated that multiple external computing devices may be connected to the industrial network 28 where each external computing device executes responsive to separate proxy instructions 87.

The metadata stored in the data structure identifies or defines the external processing device 200, the capacity of the external processing device 200, and how the industrial controller 12 is to communicate with the external processing device 200. The metadata defines which embodiment of the external processing device 200 is present in the controlled system. If the external processing device 200 is a standalone processing unit or implemented within a separate processing unit, the metadata defines, for example, the network 28 by which the industrial controller is connected to the planner, the communication protocol, a network address, and the like. If the external processing device 200 is embedded within the processor module 22, the metadata defines the function calls required to execute the external processing device 200 and defines resources of the processor module, such as a memory range, processing time, and the like required by the external processing device 200. If the external processing device 200 is inserted as a dedicated module 18 within the chassis, the metadata may identify the backplane by which the module is connected, the slot number in which the module 18 is located, a dedicated communication interval by which the dedicated module may communicate with the processor module and the like. In addition, the metadata may also define the processing capabilities of the external processing device 200 and which of the processing capabilities are to be utilized. For example, the metadata may define multiple routines present on the external processing device 200 and what data is passed between the industrial controller 12 and the external processing device 200. In general, the metadata provides the configuration information required by the industrial controller 12 to communicate with the external processing device 200.

Figure 4:
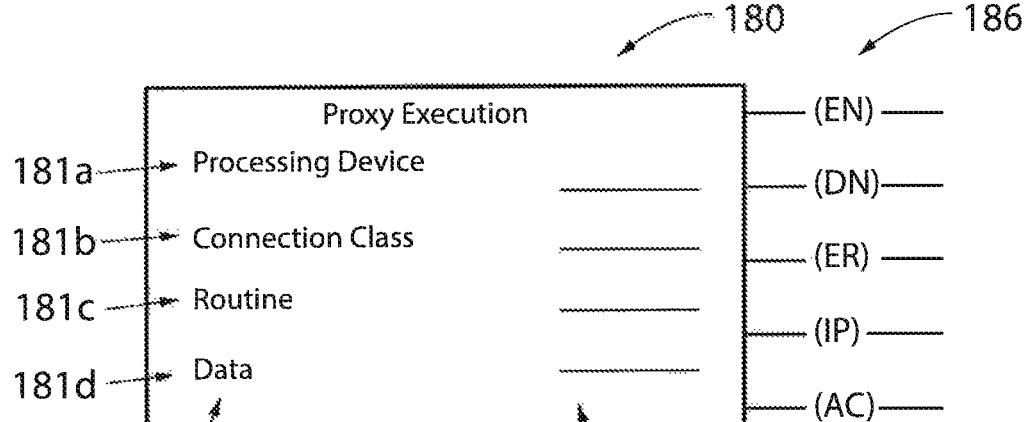
FIG. 4 is an exemplary proxy execution instruction executed by the control program of FIG. 3.

One or more proxy execution instructions 87 are defined within the industrial controller 12. With reference to FIG. 4, an exemplary proxy execution instruction 180 is illustrated. The exemplary proxy execution instruction 180 is titled Proxy Execution. The Proxy Execution instruction 180 includes multiple fields 181 that are configured by a user to define the desired instruction. Each field 181 includes a label 182 describing the field and a user interface 184 by which the user sets one or more values for the field 181. It is contemplated that the user interface 184 may take one of a number of different forms. For example, a drop-down menu may provide a user with a list of choices for the field 181. Optionally, the user interface 181 may provide a text box to receive a user-defined setting entered via a keyboard. According to still another option, a selection button or detection of a mouse located over the user interface 184 may launch a separate configuration window in which a number of configuration parameters for the field 181 may be entered.

The fields 181 illustrated in the Proxy Execution instruction 180 will be described herein as one exemplary instruction. The Proxy Execution instruction 180 will be referred to herein for convenience but is not intended to be limiting. Preferably, one proxy execution instruction 87 may be provided by the industrial controller 12 to allow for a uniform interface to external processing devices 200. However, it is contemplated that certain external processing devices 200 may include additional fields unique to the routine executing on the external processing device 200. Various other proxy execution instructions 87 with different fields may be provided within the industrial controller 12 to achieve a desired computation without deviating from the scope of the invention. The illustrated Proxy Execution instruction 180 includes a Processing Device field 181*a* in which a structure defining, for example, the type of external processing device, communication protocol, communication address, data fields, and the like. Further, the Processing Device field 181*a* may be used to select one of multiple external processing devices 200 if more than one external processing device 200 is provided in the controlled machine or process 36.

The illustrated Proxy Execution instruction 180 also includes a Connection Class field 181*b*, defining a class of connection to be established between the industrial controller 12 and the external processing device 200. The class of connection is selectable according to the requirements of the external processing device 200. A class I connection provides for continuous communication between the industrial controller 12 and the external processing device 200. The class may be limited, for example, to a maximum of 1000 bytes of data per connection to limit the bandwidth required on the industrial network 28 for continuous communication. The continuous communication is repeated at a scheduled interval, where the interval may be selected at a rate equal to or faster than a scheduled task that utilizes the data provided by the external processing device 200.

A class 3 connection provides for on-demand communication between the industrial controller 12 and the external processing device 200. The class 3 connection may be, for example, a remote procedure call (RPC). The class 3 connection is not repeated at predefined intervals, but rather, is established when the proxy execution instruction 87 indicates the connection is required. Connection resources must be maintained until the data to be communicated and/or the external processing and return data is complete. The class 3 connection may be limited, for example, to a maximum of four kilobytes (4 KB) of data to be transmitted over each established connection. The class 3 connection may be utilized when the data requires fragmentation and reassembly or compression and decompression during transmission.

The illustrated Proxy Execution instruction 180 further includes a Routine field 181*c*, and a Data field 181*d*. The routine field 181*c* may be used to identify the external processing capability present on the external processing device 200 to be executed by the instruction. In certain applications, the external processing device 200 may be a dedicated device with a single processing function. In other applications, the external processing device 200 may include multiple processing functions and the routine field 181*c* identifies which of the functions is to be executed. The Data field 181*d* may be used to identify a tag, a memory address, a table, or the like in which or from which data is to be shared between the industrial controller 12 and the external processing device 200.

It is contemplated, that a portion or all of the external processing device 200 configuration may occur during commissioning where the various information in the structure defining each external processing device 200 to be accessed outside of the control program is stored in configuration parameters accessed during execution of the control program 54.

The illustrated Proxy Execution instruction 180 also includes a number of status bits 186. According to the illustrated instruction, the status bits 186 include an enable status bit (EN), a done status bit (DN), an error status bit (ER), an in-progress status bit (IP), and an active status bit (AC). The Proxy Execution instruction 180 is assigned a tag identifying the instruction which is stored in the tag association table 92. Similarly, each of the status bits includes a tag associated with the Proxy Execution instruction 180 and identifying each status bit, where the tags for the status bits are also stored in the tag association table 92.

In operation, a proxy execution instruction 87 seamlessly integrates execution on an external computing device 200 with execution on processes internal to the industrial controller 12. During execution of a control program 54, as shown in FIG. 3, a sequence of control instructions 86 is executed. As control instructions 86 other than proxy execution instructions execute, these control instructions access data structures 88, 90, 92, 94 within memory 50 as required to perform the desired operation. Execution of the instructions occurs within the processor module 22.

When required according to the application requirements, a proxy execution instruction 87 is inserted in the control program 54 for execution. The proxy execution instruction 87 may also access data structures 88, 90, 92, 94 within memory 50 as required to perform the desired operation. During execution of the proxy execution instruction 87, a call is made by the function 101 implementing the proxy execution instruction 87 in the hardware of the processor module 22 to execute the instruction on an external processing device 200. The presence and type of external processing device 200 may be entered into configuration parameters and stored in memory 50 during commissioning of the industrial controller 12. Optionally, the presence and type of external processing device 200 may be defined in one of the user defined fields 181 of the instruction. According to still another aspect of the invention, the controlled machine or process 36 may include multiple external processing devices 200. A table may be stored in memory 50 where the table includes each of the external processing devices. The table may also include the metadata (as will be discussed in more detail below) corresponding to each external processing device. Each proxy execution instruction 87 may be configured to select one of the external processing devices from the table.

As previously discussed, the external processing device 200 may take one of several forms. According to a first embodiment, the external processing device 200 is a separate stand-alone processing device. According to a second embodiment, the external processing device 200 is within the processor module 22 of the industrial controller 12. According to a third embodiment, the external processing device 200 is a dedicated module 18 insertable within a slot of the chassis 14 for the industrial controller 12. An external processing device 200 references a processing unit other than the main thread of the processor module 22 executing the control program, where the external processing device is dedicated to executing one or more tasks. The external processing device 200 may be provided by the manufacturer of the industrial controller 12 or, optionally, the external processing device 200 may be provided by a third-party.

Accordingly, the memory 50 of the processor module 22 stores metadata defining the external processing device 200, the capacity of the external processing device and how the industrial controller is to communicate with the external processing device. The metadata defines which embodiment of the external processing device 200 is present in the controlled system. If the external processing device is a stand-alone processing unit or implemented within a separate processing unit physically external to the industrial controller 12, the metadata defines, for example, the network 28 by which the industrial controller is connected to the external processing device, the communication protocol, a network address, and the like. If the external processing device is embedded within the processor module 22 and executes, for example, on a processing thread or core in parallel to a processing thread or core executing the control program, the metadata defines the function calls required to execute the external processing device and defines resources of the processor module, such as a memory range, processing time, and the like required by the external processing device 200. If the external processing device is inserted as a dedicated module 18 within the chassis, the metadata may identify the backplane by which the module is connected, a dedicated communication interval by which the dedicated module 18 may communicate with the processor module and the like. In addition, the metadata may also define the processing capabilities of the external processing device 200 and which of the processing capabilities are to be utilized. For example, the metadata may define the available compute functions present on the external processing device. The metadata may additionally define machine data such as coordinate systems utilized by or geometry present on the machine controlled by the external processing device. In general, the metadata provides the configuration information required by the industrial controller 12 to communicate with external processing device 200 and the data required by the external processing device to perform the proxy instruction 87.

According to one embodiment of the invention, the Proxy Execution instruction 180 may be configured to interface with an external motion planner. The control program 54 includes multiple control instructions 86 including motion instructions. Generally, the control instructions may be, for example, instructions implementing timers, logic gates, flip-flops, counters, arithmetic operations, and the like expressed in a variety of different languages including relay ladder language, function block language and structured text language, all well known in the art. The control instructions may also include one or more motion instructions. The motion instructions may include commands that control movement of a motor 32, for example, between a first and second position under constraints such as maximum velocity, acceleration and jerk; jog instructions causing movement of the motor at a predetermined velocity; and coordinated motion instructions providing movement of a motor 32 in synchrony or at a predetermined ratio or other functional relationship to a second motor as determined by a cam instruction or gear instructions. Generally, each of these instructions implements a motion profile defining a series of motion positions and times generated by a motion planner.

Figure 5:
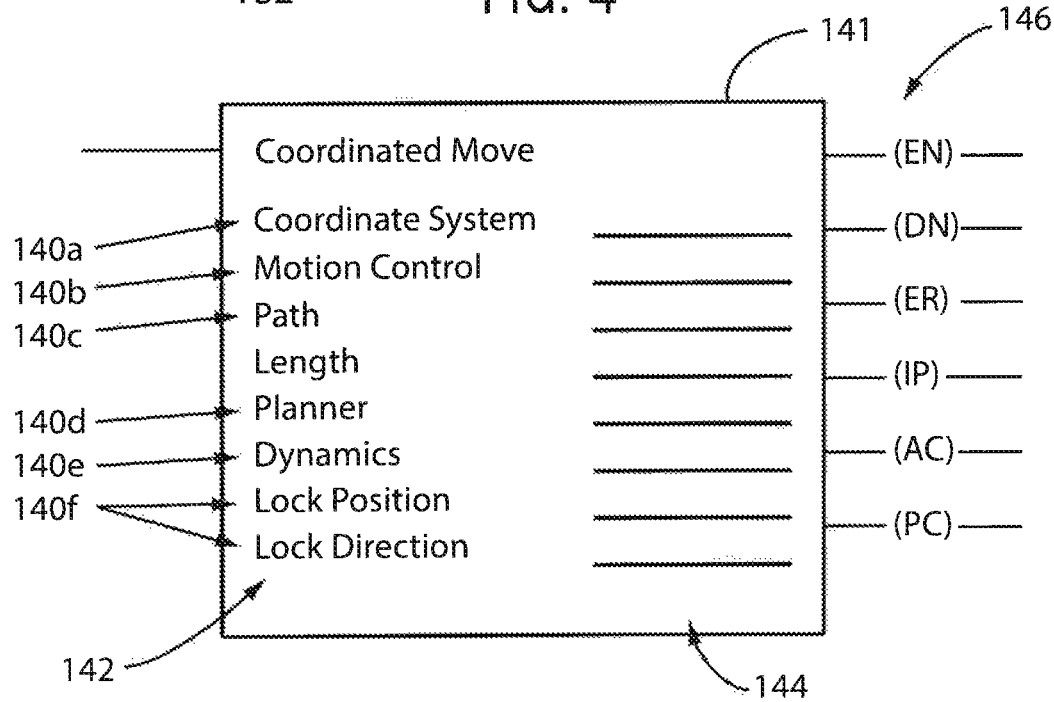
FIG. 5 is an exemplary motion instruction serving as an exemplary proxy execution instruction executed by the control program of FIG. 3.

With reference next to FIG. 5, an exemplary motion instruction 141 is illustrated as a particular example of a proxy execution instruction 87. The exemplary motion instruction 141 is titled a coordinated move. The coordinated move instruction 141 defines a motion profile for at least two axes in the controlled machine or process 36 that move in tandem, causing, for example, a workpiece to travel past a fixture in tandem with a tool on the fixture acting on the workpiece. Similarly, the two or more axes may cause a robotic arm to move in multiple axes between a first position and a second position. The coordinated move instruction includes multiple fields 140 that are configured by a user to define the desired motion. Each field 140 includes a label 142 describing the field and a user interface 144 by which the user sets one or more values for the field 140. It is contemplated that the user interface 144 may take one of a number of different forms. For example, a drop-down menu may provide a user with a list of choices for the field 140. Optionally, the user interface 144 may provide a text box to receive a user-defined setting entered via a keyboard. According to still another option, a selection button or detection of a mouse located over the user interface 144 may launch a separate configuration window in which a number of configuration parameters for the field 140 may be entered.

The fields 140 illustrated in the coordinated move instruction 141 will be described herein as one exemplary instruction. The coordinated move instruction 141 will be referred to herein for convenience as one exemplary proxy execution instruction 87 but is not intended to be limiting. Various other proxy execution instructions with different fields may be provided within the industrial controller 12 to achieve a desired function without deviating from the scope of the invention. The illustrated coordinated move instruction 141 includes a Coordinate System field 140*a* in which the multiple axes are to operate. For example, the location of the origin of the coordinate system may be defined with respect to a reference point, such that the subsequent motion commands act on each axes in a known relationship to each other. The Motion Control field 140*b* is selected to return the status and state for the coordinated move instruction 141. The Path field 140*c* may be used to define a starting point and an ending point for the desired motion. The Path field 140*c* may further include details of the motion, for example, whether motion is to occur in the shortest point between the two points, around an exclusion zone, or the like. The Dynamics field 140*e* includes a structure defining the acceleration rate, deceleration rate, acceleration jerk rate, deceleration jerk rate, maximum speed, and the like. The Lock fields 140*f* (i.e., Lock Position and Lock Direction) are provided to specify a motion event with respect to a master axis position. The Planner field 140*d* may be used to define whether the motion instruction is to be executed via an internal motion planner 100 within the industrial controller 12 or an external processing device 200 in communication with the industrial controller 12. The Planner field 140*d* may include a structure defining, for example, the type of external processing device, communication protocol, communication address, data fields, and the like. Further, the Planner field 140d may be used to select one of multiple external processing devices 200 if more than one external processing device 200 is provided in the controlled machine or process 36. Optionally, it is contemplated, that external processing device 200 configuration may occur during commissioning where the various information in the structure defining each external processing device 200 may be accessed outside of the control program and stored in configuration parameters accessed during execution of the control program 54.

The illustrated coordinated move instruction 141 also includes a number of status bits 146. According to the illustrated instruction, the status bits 146 include an enable status bit (EN), a done status bit (DN), an error status bit (ER), an in-progress status bit (IP), an active status bit (AC), and a process complete status bit (PC). The coordinated move instruction 141 is assigned a tag identifying the instruction which is stored in the tag association table 92. Similarly, each of the status bits includes a tag associated with the coordinated move instruction 141 and identifying each status bit, where the tags for the status bits are also stored in the tag association table 92.

Figure 7:
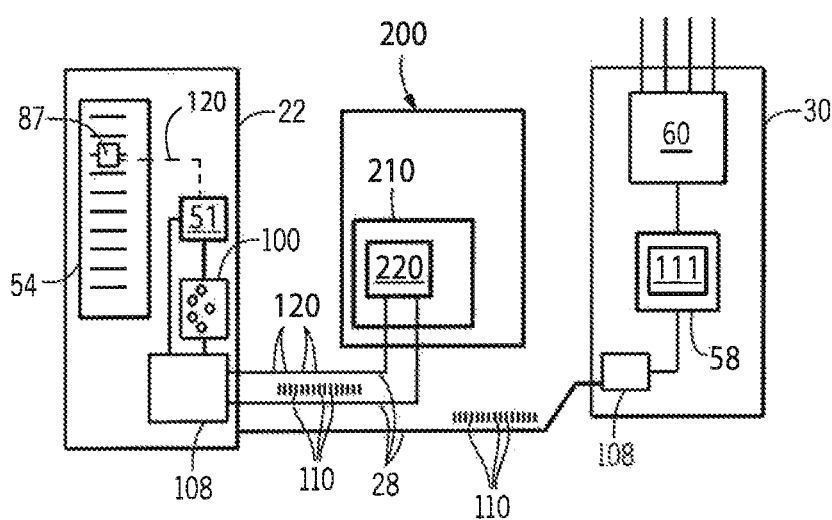
FIG. 7 is a block diagram representation of the industrial controller and one motor drive illustrating an external motion planner and motion instructions according to one embodiment of the invention.

With reference also to FIG. 7, the external processing device 200 may be an external motion planner as defined in the Planner field 140d of the coordinated move instruction 141. The coordinated move instruction 141 executes a function 101 on the industrial controller 12 that sends a motion profile 120 to the external motion planner 200 via the inter-processor interface 51. The motion profile 120 represents a desired move command for one or more axes in the controlled machine or process. The inter-processor interface 51 may also transmit data required for execution of the move command, such as parameters stored in memory 50 of the industrial controller, to the external motion planner 200. The external motion planner 200, based on parameters and the profile 120 passed from the inter-processor interface 51, processes the motion profile 120 and generates a series of motion data 110 according to the motion planning routines executing on the external planner. The series of motion data 110 generated by the external motion planner 200 is transmitted back to the industrial controller 12. The industrial controller 12 and an internal motion planner 100, executing on the industrial controller, utilizes the series of motion data 110 from the external motion planner 200 as one of multiple potential sources of motion commands to each axis and combines this series of motion data 110 with any additional series of motion data 110 present for an axis to control operation of the axis. The processor module 22, in turn, transmits the combined series of motion data 110 output from the internal motion planner 100 to the motor drive(s) 30 corresponding to the axis (axes) for which motion is desired over the industrial network 28. Thus, an external motion planner may be integrated with an internal motion planner to achieve desired operation of the controlled axes.

Figure 6:
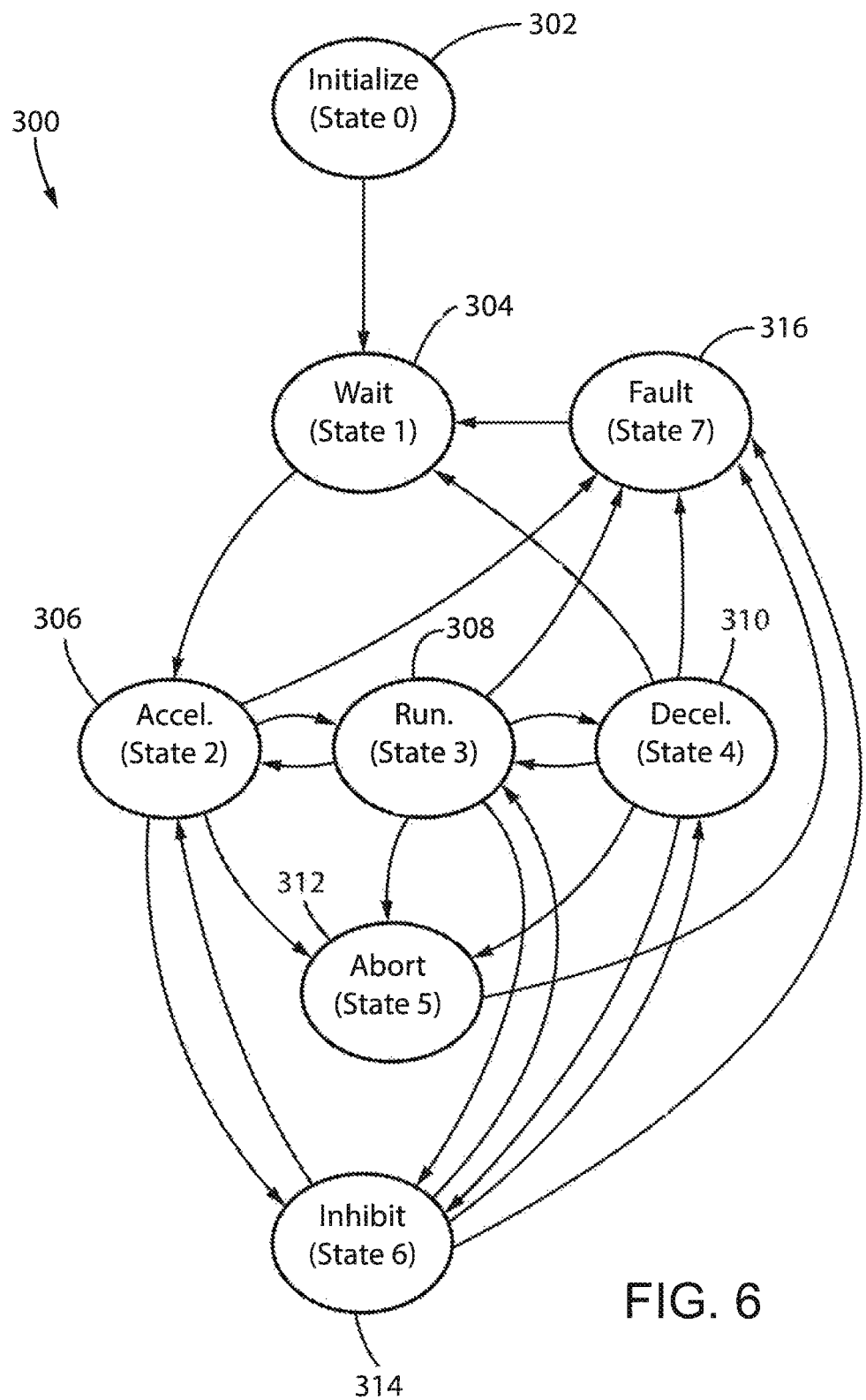
FIG. 6 is a flow diagram illustrating an exemplary state machine implemented in the industrial controller for one axis of the controlled machine or process.

As the coordinated move instruction 141 executes, the industrial controller 12 may maintain a motion state machine 300 for each axis corresponding to a current state of operation of the axis. With reference also to FIG. 6, an exemplary motion state machine 300 for one axis is illustrated. The motion state machine 300 includes an initial state (State 0) 302 during which the state machine 300 is initialized such as when power is cycled on the industrial controller 12 or on the motor drive 30 corresponding to that axis. After initialization, the state machine 300 transitions to a wait state (State 1) 304. When the control program 54 executes a motion instruction for the corresponding axis, the state machine 300 may transition through several different states during the commanded motion. For example, a simple motion profile may command an axis, and therefore, the motor 32 associated with the axis, to accelerate from a stopped condition to a constant speed, travel at the constant speed, and decelerate back to a stopped condition. As the motion profile is executed, the state machine 300 transitions through the acceleration state (State 2) 306, run state (State 3) 308, and the deceleration state (State 4). In more complicated motion profiles, the axis may be required to change speed during a move and transition back and forth between the acceleration, run, and/or deceleration states. Upon completion of the commanded motion, the axis returns to the wait state 304.

If a fault occurs during the commanded motion, the state machine 300 transitions to the fault state (State 7) 316. The industrial controller 12 may be configured to execute a fault handler routine for the axis when the state machine enters the fault state 316. The fault handler routine may determine whether an immediate stop, a controlled stop, or a message is posted for an operator while motion is allowed to proceed. If the fault handler routine provides for recovery after the fault, the state machine 300 may return to acceleration state 306, run state 308, or the deceleration state 310. Optionally, if the fault handler routine provides for an immediate or controlled stop, the state machine 300 remains in the fault state 316 until a fault reset occurs, returning the state machine 300 to the wait state 304.

It is another aspect of the invention, that the execution of an external motion planner on the external processing device 200 is integrated with an internal motion planner 100 and the state machine 300 managed by the industrial controller 12. During execution of a proxy execution instruction 87 by the external processing device 200, it is contemplated that a second motion instruction may be executed by the control program 54, where the second motion instruction is intended to be implemented by the internal motion planner 100 (see FIG. 7). It is further contemplated that the industrial controller 12 may receive an input signal at an I/O module 24, where the input signal indicates that the coordinated move instruction 141 should be altered or overridden. Integration of a function on the external processing device 200 with the state machine 300 executing on the industrial controller 12 permits subsequent motion commands and/or input signals requesting motion for an axis to be processed while the first motion instruction is still executing, thereby increasing the flexibility of control for each axis.

If the second motion instruction or an input signal requires the first motion instruction to stop, the state machine 300 may enter the abort state (State 5) 312. The abort state 312 may include one or more routines to handle an immediate stop or a controlled stop of the axis. The abort state 312 may cause a revised motion profile to be transmitted to the external processing device 200 responsive to the input or second motion command such that the immediate or controlled stop is achieved. Such operation may be desired, for example, if the control program 54 detects a problem with a workpiece during execution of the initial coordinated move instruction 141. The control program may require that the workpiece be moved to an inspection station rather than continue on its original trajectory and issues a new coordinated move instruction 141 to the external processing device 200. According to still another example, the industrial controller 12 may receive an input signal indicating an access gate has been opened or a light curtain has been broken, indicating the presence of a technician or operator within a protected region. The industrial controller 12 may issue an immediate or controlled stop, aborting the original coordinated move instruction 141.

Rather than aborting the original coordinated move instruction 141, the state machine 300 may also inhibit the original instruction. An inhibit state (State 6) 314, allows the state machine 300 to temporarily override the original coordinated move instruction 141. A second motion instruction may, for example, command a jog of an axis from a pushbutton or other operator interface. The internal motion planner 100 may generate a series of motion data 110 for the motor drive 30 corresponding to the commanded jog. The internal motion planner 100 may, in turn, inhibit the series of motion data 110 generated by the external processing device 200 until the jog command is removed. Once the jog command is removed, the internal motion planner 100 may cause the motion profile to the external processing device 200 to be updated. Alternately, the external processing device 200 may monitor the position feedback signals from the axis and continually update the series of motion data 110 during the jog command for the axis to reach the original desired location. Upon removal of the jog command, the state machine 300 leaves the inhibit state 314 and returns to the acceleration state 306, run state 308, or deceleration state 310 according to the commanded motion from the external processing device 200.

The above described state machine 300 is exemplary and is not intended to be limiting. It is contemplated that the state machine 300 may include fewer states or additional states than those illustrated and may similarly include fewer or additional transitions between states according to the application requirements.

Referring again to FIG. 5, the coordinated move instruction 141 includes a number of status bits 146. When a similar motion instruction is processed by the internal motion planner 100, the status bits 146 are updated according to the present operation of the axis or axes to be controlled by the coordinated move instruction 141. For example, when the motor drive 30 controlling operation of the motor 32 corresponding to each controlled axis is enabled, the enable status bit (EN) is set. When the motor drive 30 is providing an output voltage to the motor 32 to control operation of the motor 32, the active status bit (AC) is set. These status bits may be utilized within other rungs of the same task or within other tasks of the control program 54 by reading the value associated with each tag corresponding to the status bit to perform additional steps or to initiate other actions within the controlled machine or process 36.

For further integration of an external processing device 200 with the industrial controller 12, the status bits 146 for the coordinated move instruction 141 are similarly set when the external processing device 200 is executing a proxy execution instruction 87. With reference again to FIG. 7, the external processing device 200 executes one or more motion control routines 220 on the processor 210 in the external processing device 200. The motion control routines generate similar status bits to those set in the coordinated move instruction 141. In addition to transmitting the time series of motion data 110 generated by the external processing device 200, various status bits generated by the external processing device 200 are similarly transmitted from the external processing device 200 to the industrial controller 12.

The inter-processor interface 51 receives the status bits generated by the external processing device 200 and sets the corresponding status bits for the coordinated move instruction 141. As previously discussed, a tag is assigned to each of the status bits 146 for the coordinated move instruction 141 and stored in a tag association table 92. The tag association table 92 may further include a tag associated with each of the status bits generated by the external processing device 200 and/or an association between the status bits generated by the external processing device 200 and the status bits for the coordinated move instruction 141. As the processing device 200 transmits the status bits generated by the external motion control routines 220, the inter-processor interface 51 identifies the corresponding status bit for the coordinated move instruction 141 via the definitions in the tag association table 92. The inter-processor interface 51 then sets or resets the status bits 146 for the motion instruction according to the values of the corresponding status bits generated by the external processing device 200.

By streaming the time series of motion data 110 and the status bits from the external processing device 200 through the processor 48 of the industrial controller 12, the coordinated move instruction 141 executes within the control program 54 as if the internal motion planner 100 rather than the external processing device 200 were processing the motion profile. The industrial controller 12 is able to integrate the external motion control routines 220 within the state machine 300 for each axis and to have complete knowledge of the controlled axis throughout execution of the desired motion profile. The industrial controller 12 has knowledge, for example, of the current position, the commanded position, and the current operating status of the axis. In contrast, prior art systems only passed the move command to the external processing device 200 and waited either for a predefined time in which the move was expected to complete or for a response from the external motion planner indicating that the motion was complete. The integration of the external motion planner further allows other systems, such as safety systems, jog functions, leader/follower functions, gearing functions, axis offsets, and the like that are already implemented within the industrial controller 12 to be readily applied to the external processing device 200. These internal functions are executed by the internal motion planner 100, generating a first time series of motion data for each axis, and the motion profile is processed by the external processing device 200, generating a second time series of motion data, where the two time series of motion data are summed together to result in a modified, or combined, time series of motion data to be output to the motor drive 30 for each axis.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. An industrial controller configured to coordinate execution of an external processing device with the industrial controller, the industrial controller comprising:
    a memory device operative to store a control program, metadata, a plurality of data fields, and a state machine, wherein:
        the metadata defines the external processing device and communication between the external processing device and the industrial controller, and
        the plurality of data fields includes at least one data structure utilized by the control program, the at least one data structure selected from a hardware table, a connection list, an association list, and an I/O table;
    a processor operative to execute the control program, wherein:
        the control program includes at least one proxy instruction to be executed on an external processing device,
        the control program includes a plurality of additional instructions other than the at least one proxy instruction,
        at least one of the plurality of additional instructions is configured to access data in the plurality of data fields during execution on the processor,
        at least one of the plurality of additional instructions is configured to change a state of the state machine; and
    an inter-processor interface operative to integrate execution of the at least one proxy instruction on the external processing device with execution of the plurality of additional instructions on the processor, wherein:
        the at least one proxy instruction obtains the metadata defining the external processing device and communication between the external processing device and the industrial controller,
        the at least one proxy instruction identifies the data from the plurality of data fields, wherein the data is required for execution of the corresponding proxy instruction,
        the inter-processor interface reads the data and the state of the state machine from the memory device and transmits the data to the external processing device according to the communication defined in the metadata,
        the processor continues execution of the plurality of additional instructions to change the state of the state machine in tandem with the external processing device processing the data,
        the inter-processor interface receives a response from the external processing device indicating a status of processing the at least one proxy instruction, and
        the at least one proxy instruction changes the state of the state as a function of the response received from the external processing device.

2. The industrial controller of claim 1 wherein:
    the inter-processor interface establishes a connection between the processor and the external processing device as a function of the metadata to transmit the data to the external processing device when the control program executes the proxy instruction.

3. The industrial controller of claim 1 wherein the at least one proxy instruction includes an in-process status bit and a complete status bit.

4. The industrial controller of claim 3 wherein the inter-processor interface is operative to set and reset the in-process status bit and the complete status bit for each proxy instruction as a function of the response received from the external processing device.

5. The industrial controller of claim 1 wherein:
    the external processing device is operative to change the data obtained from the plurality of data fields during execution of the at least one proxy instruction,
    the inter-processor interface is further configured to receive the changed data from the external processing device, and
    the inter-processor interface writes the changed data to the data in the plurality of data fields in the memory device of the industrial controller.

6. The industrial controller of claim 1 wherein the at least one proxy instruction includes at least one user definable field, wherein the at least one user definable field is configured when the control program is developed.

7. The industrial controller of claim 1 wherein the external processing device is selected from one of a processing device physically external to the industrial controller, a processing thread executing in parallel on the processor with a thread executing the control program, and a module insertable into a chassis of the industrial controller.

8. A method of coordinating execution of an external processing device with an industrial controller, the method comprising the steps of:
    executing a plurality of control instructions on a processor of an industrial controller, wherein:
        the plurality of control instructions access a state machine and data from a plurality of data fields stored in memory of the industrial controller,
        the plurality of data fields includes at least one data structure utilized by the control program, the at least one data structure selected from a hardware table, a connection list, an association list, and an I/O table;
the plurality of control instructions includes at least one proxy instruction, and
the plurality of control instructions includes a plurality of additional instructions other than the at least one proxy instruction, wherein at least one of the plurality of additional instructions is configured to change a state of the state machine;
executing the at least one proxy instruction on the processor of the industrial controller, wherein:
the at least one proxy instruction obtains metadata defining the external processing device and communication between the external processing device and the industrial controller,
the at least one proxy instruction defines at least one function to be executed on an external processing device,
the at least one proxy instruction defines the data from the plurality of data fields,
the data obtained by the at least one proxy instruction is shared data,
at least one of the plurality of additional instructions is configured to access the shared data, and
the shared data is required for execution of the at least one proxy instruction;
reading the shared data and a state of the state machine with an inter-processor interface executing on the industrial controller responsive to executing the at least one proxy instruction;
reading metadata from the memory with the inter-processor interface responsive to executing the at least one proxy instruction, wherein the metadata defines the external processing device and communication between the external processing device and the industrial controller;
transmitting the shared data to the external processing device with the inter-processor interface according to the communication defined in the metadata;
executing at least one of the plurality of additional instructions configured to change a state of the state machine in tandem with the external processing device processing the shared data;
receiving at the inter-processor interface a response from the external processing device indicating a status of executing the at least one function defined by the at least one proxy instruction; and
changing the state of the state machine with the at least one proxy instruction as a function of the response received from the external processing device.

9. The method of claim 8 further comprising the step of:
establishing a connection between the processor and the external processing device as a function of the metadata to transmit the shared data to the external processing device when the control program executes the proxy instruction.

10. The method of claim 8 wherein the at least one proxy instruction includes an in-process status bit and a complete status bit.

11. The method of claim 10 further comprising the step of setting a value of the in-process status bit and a value of the complete status bit responsive to the response received from the external processing device.

12. The method of claim 8 wherein the inter-processor interface transmits an initial value of the shared data to the external processing device, the method further comprising the steps of:

receiving a changed value of the shared data from the external processing device at the inter-processor interface; and
writing the changed value of the shared data to the data in the plurality of data fields in the memory of the industrial controller with the inter-processor interface.

13. The method of claim 8 wherein the at least one proxy instruction includes at least one user definable field configured when the control program is developed.

14. The method of claim 8 wherein the external processing device is selected from one of a processing device physically external to the industrial controller, a processing thread executing in parallel on the processor of the industrial controller with a thread executing the plurality of control instructions, and a module insertable into a chassis of the industrial controller.

15. A processor module for an industrial controller configured to coordinate execution of an external processing device with the industrial controller, the processor module comprising:
a memory operative to store a control program, a plurality of data fields, and a state machine; and
a processor operative to execute the control program, wherein:
the control program includes at least one proxy instruction,
the control program includes a plurality of control instructions other than the at least one proxy instruction,
at least one of the plurality of control instructions changes a state of the state machine,
the plurality of data fields includes shared data changed by both the plurality of control instructions and the at least one proxy instruction,
the shared data includes the state of the state machine;
the at least one proxy instruction obtains shared data required for execution of the corresponding proxy instruction,
the at least one proxy instruction defines at least one function to be executed on an external processing device, and
the processor is further operative to execute the at least one proxy instruction by:
reading the shared data,
transmitting the shared data to the external processing device,
continuing execution of the plurality of control instructions to change the state of the state machine during execution of the at least one proxy instruction,
receiving a response from the external processing device indicating a status of processing the at least one proxy instruction, and
changing the state of the state machine responsive to receiving the response from the external processing device.

16. The processor module of claim 15 wherein:
the memory is further operative to store a table of external processing devices,
the table defines metadata corresponding to each of the external processing devices in the table,
each of the at least one proxy instructions identifies one of the external processing devices in the table on which the corresponding proxy instruction is to be executed, and
the processor is further operative to:
read the metadata corresponding to the at least one proxy instruction from the table when the control program executes the proxy instruction, and establish a connection between the processor and the external processing device as a function of the metadata to transmit the data to the external processing device.

17. The processor module of claim 15 wherein:

the at least one proxy instruction includes an in-process status bit and a complete status bit, and the processor is further operative to set and reset the in-process status bit and the complete status bit for each proxy instruction as a function of the response received from the external processing device.

18. The processor module of claim 15 wherein:

the external processing device is operative to change the shared data during execution of the at least one proxy instruction, and the processor is further operative to:
  receive changed data from the external processing device, and
  write the changed data to the shared data in the plurality of data fields.

* * * * *